# 3,230,041
METHOD FOR MAKING TETRA-ALKALI METAL PYROPHOSPHATE

James W. Edwards and Arno H. Herzog, St. Louis, Mo., assignors to Monsanto Company, a corporation of Delaware
No Drawing. Filed Nov. 29, 1962, Ser. No. 241,029
10 Claims. (Cl. 23—107)

The present application is a continuation-in-part of U.S. application Serial No. 534,140, filed September 13, 1955, now forfeited.

This invention relates to an improved method for producing tetra-alkali metal pyrophosphates such as tetrasodium pyrophosphate.

The commercial production of tetra-alkali metal pyrophosphates is ordinarily carried out by calcining a di-alkali metal orthophosphate at an elevated temperature, e.g., somewhere between about 300° C. and about 900° C. The anhydrous di-alkali metal orthophosphate or its hydrate is normally a dry, granular solid and is converted to dry, granular solid tetra-alkali metal pyrophosphate without sintering or passing through any non-crystalline or liquid phase.

It has now been found that the rate of conversion of a di-alkali metal orthophosphate to the corresponding tetra-alkali metal pyrophosphate at any given temperature can be increased, or conversely, that the temperature required for any particular rate of conversion can be decreased, by the addition of a minor amount of a fluxing agent to the reaction mass.

Fluxing agents used in accordance with this invention are materials which when added to a di-alkali metal orthophosphate, such as disodium orthophosphate or dipotassium orthophosphate, will form a mixture having an amorphous, plastic, or fluid phase at a calcining temperature above about 150–200° C. but below about 900° C. Particularly preferred are fluxing agents which will form such a phase at temperatures below about 500° C. Of the various fluxing agents useful in this invention, those which are salts, and especially inorganic salts, are especially effective. A preferred class of salts are those having either water of constitution or water of hydration therein. Examples of suitable salts are the mono-alkali metal orthophosphates, either in the anhydrous or hydrated form, as illustrated by monosodium orthophosphate and monosodium orthophosphate monohydrate; double salts made up of equimolar proportions of a mono-alkali metal orthophosphate and a di-alkali metal orthophosphate such as the double salt formed from equimolar proportions of monosodium orthophosphate and disodium orthophosphate; alkali metal acid pyrophosphates as illustrated by sodium acid pyrophosphate; alkali metal sulfates and bisulfates such as sodium sulfate and sodium bisulfate; alkali metal salts of lower fatty acids such as sodium acetate; the mono-alkali metal arsenates such as sodium acid arsenate; alkali metal nitrates and nitrites such as sodium nitrate and sodium nitrite; and ammonium salts of inorganic acids such as ammonium nitrate, ammonium phosphate and ammonium chloride. Particularly preferred materials are the phosphate salts other than disodium orthophosphate.

The fluxing agent need not be added in amounts sufficient to make the entire reaction mass fluid. The fluxing agent should be added in amounts sufficient to cause a fluid or plastic amorphous phase to form on the surface of the di-alkali metal orthophosphate particles. The amounts of fluxing agent necessary to achieve this result will generally run between about 0.5 and about 10 weight percent of the di-alkali metal orthophosphate, and preferably between about 1 and about 6 weight percent.

The fluxing agent can be added to the di-alkali metal orthophosphate in any desired manner. For example, a solution of the fluxing agent can be sprayed upon the di-alkali metal orthophosphate in anhydrous form or in the form of a crystalline hydrate, the fluxing agent in anhydrous form can be mixed with the orthophosphate in anhydrous form, or the fluxing agent and the di-alkali metal orthophosphate can be simultaneously precipitated from an aqueous solution formed from a mixture of the two.

The following example is presented as illustrative of the advantageous results to be obtained by using the fluxing agents of the present invention:

EXAMPLE

Five percent by weight of various fluxing materials were added to anhydrous disodium orthophosphate and the conversion to tetrasodium pyrophosphate at 250° C. was determined after 30 minutes and after 100 minutes. The results are set forth in the following table:

Table

| Additive, 5 wt. Percent | Percent Conversion to $Na_4P_2O_7$ | |
|---|---|---|
| | After 30 min. | After 100 min. |
| None | 30 | 68 |
| $NaH_2PO_4$ | 84 | 93 |
| $NaH_2PO_4.H_2O$ | 86 | 95 |
| $NaH_2PO_4.Na_2HPO_4$ | 78 | 90 |
| $Na_2H_2P_2O_7$ | 62 | 84 |
| $NaHSO_4$ | 70 | 80 |

As will be apparent from the foregoing example, the present discovery is particularly advantageous in that it allows carrying out the reaction at considerably lower than usual temperatures with no substantial sacrifice in conversion rate. Consequently, a preferred embodiment of the invention constitutes carrying out the present improved process at a temperature below about 500° C., and preferably between about 200° and about 400° C. It will be readily apparent that the fluxing agents to be used at these lower temperatures must be ones which will form an amorphous or fluid phase with the disodium orthophosphate at or below the reaction temperature.

The procedure when preparing other tetra-alkali metal pyrophosphates and/or when using other fluxing agents can be generally the same as illustrated in the above example.

We claim:
1. In the process of producing an anhydrous tetra-alkali metal pyrophosphate by molecular dehydration of a di-alkali metal orthophosphate, the improvement which comprises carrying out said molecular dehydration at a temperature within the range of from about 150° C. to 900° C. in the presence of from about 0.5 and 10 weight percent of a fluxing agent which will form a fluid phase in combination with said di-alkali metal orthophosphate at a temperature within said temperature range, said fluxing agent being selected from the group consisting of mono-alkali metal orthophosphates, double salts of mono-alkali metal and di-alkali metal orthophosphates, alkali metal acid pyrophosphates, alkali metal sulfates, alkali metal bisulfates, akali metal salts of lower fatty acids, mono-akali metal arsenates, alkali metal nitrates, alkali metal nitrites, and ammonium salts of inorganic acids selected from the group consisting of ammonium nitrate, ammonium phosphates and ammonium chloride, the temperature at which said dehydration is carried out and the amount of said fluxing agent being sufficient to cause an amorphous phase to form at the surface of said di-alkali metal orthophosphate but not sufficient to cause the entire reaction mass to become fluid, thereby producing said anhydrous tetra-alkali metal pyrophosphate at a faster rate than would have occurred under the otherwise same conditions in the absence of said 0.5 to 10 weight percent of said fluxing agent.

2. A method according to claim 1 wherein said dehydration is performed at a temperature below about 500° C. but above about 200° C. and the amount of said fluxing agent employed is at least about 1 weight percent.

3. In the process of producing anhydrous tetra-sodium pyrophosphate by molecular dehydration of disodium orthophosphate, the improvement which comprises carrying out said molecular dehydration at a temperature within the range of from about 200° C. to 500° C. in the presence of from about 0.5 and 10 weight percent of a fluxing agent which will form a fluid phase in combination with said disodium orthophosphate at a temperature within said temperature range, said fluxing agent being selected from the group consisting of mono-alkali metal orthophosphates, double salts of mono-alkali metal and di-alkali metal orthophosphates, alkali metal acid pyrophosphates, alkali metal sulfates, alkali metal bisulfates, alkali metal salts of lower fatty acids, mono-alkali metal arsenates, alkali metal nitrates, alkali metal nitrites, and ammonium salts of inorganic acids selected from the group consisting of ammonium nitrate, ammonium phosphates and ammonium chloride, the temperature at which said dehydration is carried out and the amount of said fluxing agent being sufficient to cause an amorphous phase to form at the surface of said disodium orthophosphate but not sufficient to cause the entire reaction mass to become fluid, thereby producing said anhydrous tetrasodium pyrophosphate at a faster rate than would have occurred under the otherwise same conditions in the absence of said 0.5 to 10 weight percent of said fluxing agent.

4. In the process of producing anhydrous tetrapotassium pyrophosphate by molecular dehydration of a dipotassium orthophosphate, the improvement which comprises carrying out said molecular dehydration at a temperature within the range of from about 200° C. to 500° C. in the presence of from about 0.5 and 10 weight percent of a fluxing agent which will form a fluid phase in combination with said dipotassium orthophosphate at a temperature within said temperature range, said fluxing agent being selected from the group consisting of mono-alkali metal orthophosphates, double salts of mono-alkali metal and di-alkali metal orthophosphates, alkali metal acid pyrophosphates, alkali metal sulfates, alkali metal bisulfates, alkali metal salts of lower fatty acids, mono-alkali metal arsenates, alkali metal nitrates, alkali metal nitrites, and ammonium salts of inorganic acids selected from the group consisting of ammonium nitrate, ammonium phosphates and ammonium chloride, the temperature at which said dehydration is carried out and the amount of said fluxing agent being sufficient to cause an amorphous phase to form at the surface of said dipotassium orthophosphate but not sufficient to cause the entire reaction mass to become fluid, thereby producing said anhydrous tetrapotassium pyrophosphate at a faster rate than would have occurred under the otherwise same conditions in the absence of said 0.5 to 10 weight percent of said fluxing agent.

5. In the process of producing anhydrous tetrasodium pyrophosphate by molecular dehydration of anhydrous disodium orthophosphate, the improvement which comprises carrying out said molecular dehydration at a temperature between about 200° C. and about 400° C. in the presence of between about 1 and about 6 weight percent of a sodium phosphate salt which contains water of constitution and will form a fluid phase in combination with anhydrous disodium orthophosphate at a temperature below 500° C., said temperature and said concentration being sufficient to cause an amorphous phase to form at the surface of said disodium orthophosphate but not sufficient to cause the entire reaction mass to become fluid, and thereby producing said anhydrous tetrasodium pyrophosphate at a faster rate than would have occurred under the otherwise same conditions in the absence of the aforesaid 1 to 6 weight percent of the specified sodium phosphate salt.

6. In the process of producing anhydrous tetrasodium pyrophosphate by molecular dehydration of disodium orthophosphate, the improvement which comprises carrying out said dehydration at a temperature between about 200° C. and about 500° C. in the presence of between about 1 and about 6 weight percent of a phosphate salt which will form a fluid phase in combination with anhydrous disodium orthophosphate at a temperature below 500° C., said temperature and the amount of said phosphate salt being sufficient to cause an amorphous phase to form at the surface of said disodium orthophosphate but not sufficient to cause the entire reaction mass to become fluid, and thereby producing said anhydrous tetrasodium pyrophosphate at a faster rate than would have occurred under the otherwise same conditions in the absence of the aforesaid 1 to 6 weight percent of the specified phosphate salt.

7. In the process of producing anhydrous tetrasodium pyrophosphate by molecular dehydration of anhydrous disodium orthophosphate, the improvement which comprises carrying out said molecular dehydration at a temperature between about 200° C. and about 400° C. in the presence of between about 2 and about 6 weight percent of monosodium orthophosphate to accelerate the conversion of said anhydrous disodium orthophosphate to anhydrous tetrasodium pyrophosphate, said temperature and said concentration being sufficient to cause an amorphous phase to form at the surface of said disodium orthophosphate but not sufficient to cause the entire reaction mass to become fluid, and thereby producing said anhydrous tetrasodium pyrophosphate at a faster rate than would have occurred under the otherwise same conditions in the absence of said monosodium orthophosphate.

8. In the process of producing anhydrous tetrasodium pyrophosphate by molecular dehydration of anhydrous disodium orthophosphate, the improvement which comprises carrying out said molecular dehydration at a temperature between about 200° C. and about 400° C. in the presence of between about 2 and about 6 weight percent of the double salt made up of equal molar proportions of monosodium orthophosphate and disodium orthophosphate, said double salt being added to accelerate the conversion of said anhydrous disodium orthophosphate to anhydrous tetrasodium pyrophosphate, said temperature and said concentration being sufficient to cause an amorphous phase to form at the surface of said disodium orthophosphate but not sufficient to cause the entire reaction mass to become fluid, and thereby producing said anhydrous tetrasodium pyrophosphate at a faster rate than would have occurred under the otherwise same conditions in the absence of the aforesaid double salt.

9. In the process of producing anhydrous tetrasodium pyrophosphate by molecular dehydration of anhydrous disodium orthophosphate, the improvement which comprises carrying out said molecular dehydration at a temperature between about 200° C. and about 400° C. in the presence of between about 2 and about 6 weight percent of sodium acid sulfate to accelerate the conversion of said anhydrous disodium orthophosphate to anhydrous tetrasodium pyrophosphate, said temperature and said concentration being sufficient to cause an amorphous phase to form at the surface of said disodium orthophosphate but not sufficient to cause the entire reaction mass to become fluid, and thereby producing said anhydrous tetrasodium pyrophosphate at a faster rate than would have occurred under the otherwise same conditions in the absence of said sodium acid sulfate.

10. In the process of producing anhydrous tetrasodium pyrophosphate by molecular dehydration of anhydrous disodium orthophosphate, the improvement which comprises carrying out said molecular dehydration at a temperature between about 200° C. and about 500° C. in the presence of between about 1 and about 10 weight percent of monosodium orthophosphate to accelerate the conversion of anhydrous disodium orthophosphate to anhydrous tetrasodium pyrophosphate, said temperature and said concentration being sufficient to cause an amorphous phase to form at the surface of said disodium orthophosphate but not sufficient to cause the entire reaction mass to become fluid, and thereby producing said anhydrous tetrasodium pyrophosphate at a faster rate than would have occurred under the otherwise same conditions in the absence of said monosodium orthophosphate.

References Cited by the Examiner

UNITED STATES PATENTS

| | | | |
|---|---|---|---|
| 2,105,446 | 1/1938 | Wilson | 23—106 |
| 2,182,357 | 12/1939 | Schwartz | 23—106 |
| 2,493,809 | 1/1950 | Garrison | 23—106 |
| 2,511,249 | 6/1950 | Durgin et al. | 23—106 |
| 2,811,419 | 10/1957 | Hartlapp et al. | 23—107 |
| 2,898,189 | 8/1959 | Rodis et al. | 23—107 |
| 2,986,449 | 5/1961 | Rodis et al. | 23—106 |
| 3,094,382 | 6/1963 | Bigot | 23—107 |

OTHER REFERENCES

Van Wazer: "Phosphorus and Its Compounds," Interscience-New York, 1958, vol. I, pp. 423, 618.

MAURICE A. BRINDISI, *Primary Examiner.*